United States Patent [19]

Fujii et al.

[11] Patent Number: 4,856,849
[45] Date of Patent: Aug. 15, 1989

[54] DISK WHEEL FOR A MOTOR VEHICLE

[75] Inventors: Katsuhiko Fujii; Shiro Sato; Yasuhiro Miyanaga; Heizo Asami; Susumu Takekoshi; Yasuo Kasai, all of Wako, Japan

[73] Assignee: Honda Giken Kogyo Kabushiki Kaisha, Tokyo, Japan

[21] Appl. No.: 34,960

[22] Filed: Apr. 6, 1987

[30] Foreign Application Priority Data

Apr. 4, 1986 [JP] Japan .............................. 61-49784[U]
Apr. 4, 1986 [JP] Japan .............................. 61-49785[U]

[51] Int. Cl.$^4$ ............................................ B60B 21/02
[52] U.S. Cl. .................................... 301/63 R; 301/95; 152/411
[58] Field of Search ................. 152/DIG. 9, 513, 544, 152/543, 411, 396, 402; 301/63 R, 63 DD, 62, 65, 95, 96, 97, 98

[56] References Cited

U.S. PATENT DOCUMENTS

| | | | |
|---|---|---|---|
| 2,787,312 | 4/1957 | Servaes | 152/513 |
| 3,504,725 | 4/1970 | Fletcher et al. | 152/DIG. 9 |
| 4,165,777 | 8/1979 | Sano | 152/411 |
| 4,234,236 | 11/1980 | Inbody | 152/411 X |
| 4,363,347 | 12/1982 | Baumgarther | 152/411 |
| 4,405,032 | 9/1983 | Welschof et al. | 301/6 WB X |
| 4,421,821 | 12/1983 | Matsubara et al. | 152/DIG. 9 X |

FOREIGN PATENT DOCUMENTS

| | | | |
|---|---|---|---|
| 430993 | 4/1947 | Italy | 301/63 R |
| 576398 | 8/1957 | Italy | 301/63 R |
| 61-12401 | 1/1986 | Japan | 301/63 R |
| 802012 | 9/1958 | United Kingdom | 301/97 |
| 1261892 | 1/1972 | United Kingdom | 301/63 R |

Primary Examiner—Russell D. Stormer
Attorney, Agent, or Firm—Armstrong, Nikaido, Marmelstein, Kubovcik & Murray

[57] ABSTRACT

A disk wheel for a motor vehicle includes an inner rim portion and a disk portion which are formed integrally with each other. An outer rim portion which is independent of the inner rim portion and disk portion is rigidly fitted on the outer circumferential surface of the disk portion. The inner and outer rim portions are different in thickness from each other, so that the inner rim portion is provided with greater rigidity without increasing the overall weight of the disk wheel.

2 Claims, 3 Drawing Sheets

DISK WHEEL FOR A MOTOR VEHICLE

BACKGROUND OF THE INVENTION

The present invention relates to a disk wheel for a motor vehicle which consists of a rim section and a disk section and, more particularly, to a steel disk wheel which is formed of a steel sheet.

A motor vehicle is generally furnished with a disk wheel which consists of a hollow cylindrical rim section for mounting a tire, and a disk section for mounting the wheel to a hub. A disk wheel of this kind is often formed of a steel sheet.

It has been customary to form the rim section and the disk section of a steel disk wheel independently of each other and put them together by fitting the disk section in the inner periphery of the rim section and connecting them by welding. The rim section is produced by roll-forming a steel sheet while the disk section is produced by press-forming a steel sheet. Hence, the rim section has the same thickness in both of its inner rim portion and outer rim portion.

The disk section includes a disk surface which is usually offset toward the outer rim portion with respect to the center of the rim width, so that the distance between an extension of a king pin shaft and the center of the tread of a tire, i.e., scrub distance may be maintained short. This necessarily causes the disk surface to be positioned at a substantial distance from the inner rim portion, resulting that a considerable bending moment acts on the inner rim portion due to a load imparted from a tire. The inner rim portion, therefore, has to be provided with greater rigidity than the outer rim portion so as to withstand such bending moments.

However, when it comes to a prior art rim section having an inner rim portion and an outer rim portion which are formed integrally by roll-forming, the thickness cannot be varied from the inner rim portion to the outer rim portion. The only implementation available to enhance the rigidity of the inner rim part is increasing the thickness of the whole rim section at the cost of weight.

To accurately fit and secure a tire to the rim section, the rim section is provided with flange surfaces for making close contact with the sides of the beads of a tire and bead seat surfaces for making close contact with the inner circumference of the same. A prerequisite with such a rim section is that the flange surfaces and the bead seat surfaces, especially those of the inner rim portion which is remote from the disk surface, be maintained in a true circular configuration with respect to the center of rotation of the wheel. This requisite cannot be readily satisfied with the prior art fitting type assembly of the rim section and disk section. For example, when the disk section is fitted in the rim section in an inclined position relative to the center plane of the rim width, the flange surfaces and bead seat surfaces become eccentric to the center axis of the disk section, i.e., the axis of rotation of the wheel.

Moreover, the accuracy of those flange surfaces and bead seat surfaces is critically effected by that of a roll-forming or press-forming machine. Hence, it is difficult for the accuracy of flange surfaces and bead seat surfaces to be enhanced to a satisfactory degree. It has therefore been practiced to precision-finish the flange surfaces and bead seat surfaces of a steel disk wheel by cutting after the assemblage of the wheel.

A problem with such a cutting-after-assemblage scheme is that because the rim section of a steel disk wheel is formed of a thin sheet, the flange surfaces and bead seat surfaces cannot be precisely cut with ease. Especially, the flange surfaces are apt to be deformed sideways and, thereby, oscillate when a tool is applied thereto, because they are located at the opposite free ends of the rim section and, moreover, extend substantially vertically to the axis of the rim section. This brings about fine undulation on the resultant flange surfaces. The undulation on the tire support surfaces would not only make it difficult to securely hold a tire but also develop clearance between a tire and the rim section to lower sealability and, thereby, aggravate leakage of air from the tire.

When the circularity of a wheel is implemented with cutting only, it often occurs that a wheel has to be cut by a considerable amount. Such would reduce the thickness and, therefore, the mechanical strength of the rim section.

Another drawback with the welded rim and disk assembly is that the welded area of the assembly is exposed to the atmosphere and, therefore, easy to gather rust due to deposition of water.

SUMMARY OF THE INVENTION

It is therefore an object of the present invention to increase the rigidity of the inner rim portion without increasing the thickness of the outer rim portion, thereby promoting lightweight design of a disk wheel.

It is another object of the present invention to allow the flange surfaces and bead seat surfaces to be accurately machined with ease without deteriorating their mechanical strength.

It is another object of the present invention to provide a disk wheel for a motor vehicle in which a welded area is isolated from the atmosphere to be substantially freed from rust.

In order to achieve the above objects, in accordance with the present invention, an inner rim portion and a disk portion are formed integrally with each other while an outer rim portion, which is independent of the inner rim and disk portions, is rigidly fitted on the outer circumferential surface of the disk portion.

The integral structure of the inner rim and disk portions allows a flange surface and a bead seat surface of the inner rim portion to be accurately positioned relative to a disk surface of the disk portion. Because the inner rim and outer rim portions are independent to each other, the thickness of the inner rim portion can be increased without increasing that of the outer rim portion so as to enhance the rigidity of the inner rim portion, promoting the cut-down of the overall weight of the disk wheel. Furthermore, because the outer rim portion is coupled on the outer circumferential surface of the disk portion, the welded area is concealed by a tire and, therefore, free from contact with water which would otherwise cause it to gather rust.

In a preferred embodiment of the present invention, a layer of resin is provided on each of the flange and bead seat surfaces by molding or coating resin.

The resin which builds up on the flange and bead seat surfaces may be cut to insure circularity of the wheel simply and, yet, accurately without effecting the mechanical strength. Resin layers are inherently easy to cut and do not entail undulation and others on cut surfaces thereof. Because the flange and bead seat surfaces are finished smooth as stated, not only the sealability between a tire and the wheel is enhanced but also efficient mounting and dismounting of a tire is promoted. In addition, the resin layers intervening between a tire and the wheel serve to damp vibrations imparted from the tire, whereby the transmission of vibrations to a suspension system of a motor vehicle is suppressed.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
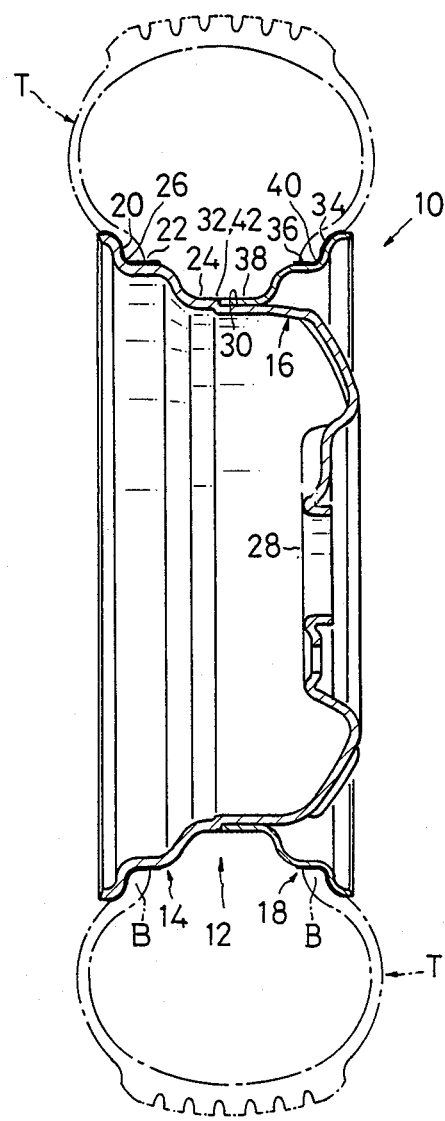
FIG. 1 is a vertical section showing a disk wheel for a motor vehicle in accordance with the present invention.
Figure 2:
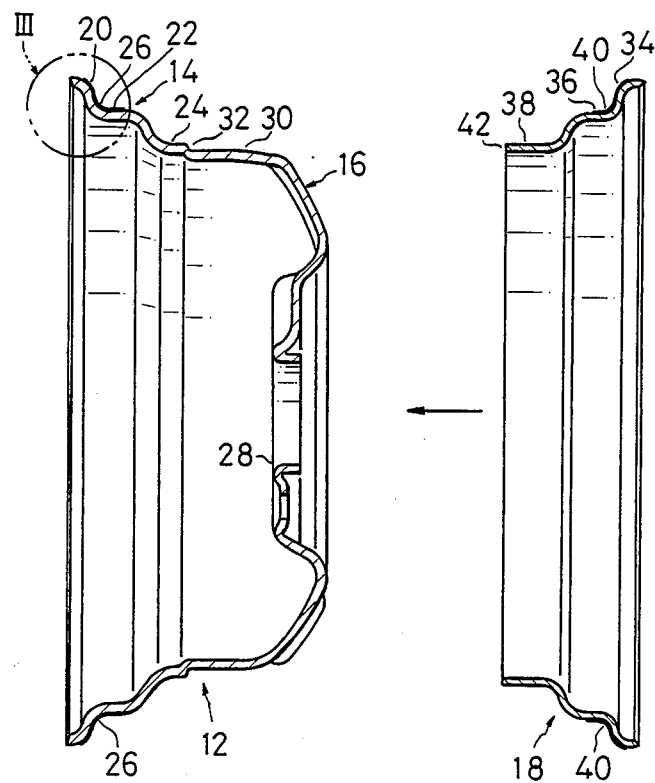
FIG. 2 is an exploded vertical section of the disk wheel as shown in FIG. 1.
Figure 3:
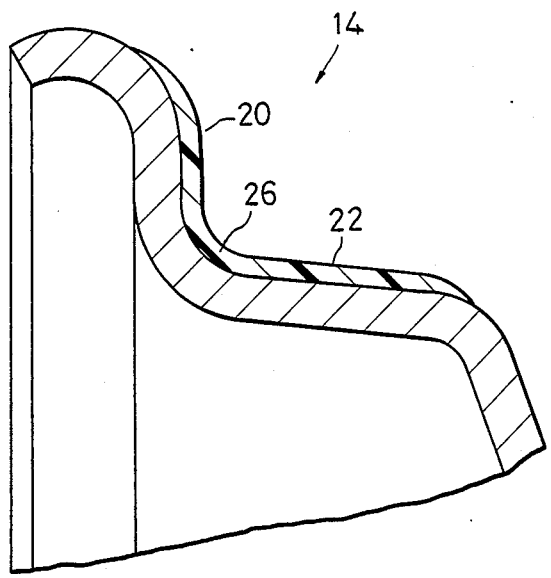
FIG. 3 is an enlarged view of a portion of the disk wheel which is indicated by III in FIG. 2.

Referring to FIGS. 1 and 2, a disk wheel embodying the present invention is shown and generally designated by the reference numeral 10. As shown, the disk wheel 10 generally comprises a wheel body 12 made up of an inner rim portion 14 and a disk portion 16 which are integral with each other, and an outer rim portion 18 fitted on the outer circumferential surface of the disk portion 16. The wheel body 12 is produced by press-forming, or contracting, a relatively thick steel sheet. The inner rim portion 14 is provided with a flange surface 20, a bead seat surface 22, and a well surface 24. Extending substantially perpendicular to the axis of rotation of the wheel, the flange surface 20 is adapted to support the side wall of a bead B of a tire T. Extending substantially parallel to the axis of wheel rotation, the bead seat surface 22 serves to support the inner circumferential surface of the bead B. As shown in detail in FIG, 3, the flange surface 20 and the bead seat surface 22 are constituted by a layer of resin 26. The layer of resin 26 may be molded integrally with the inner rim portion 14 while the latter is formed, or may be provided by coating the inner rim portion 14 with resin.

The disk portion 16 is provided with a disk surface 28 which is adapted to mount the disk wheel 10 to a wheel hub, not shown. The disk surface 28 extends perpendicular to the axis of rotation of the wheel 10. The outer circumferential surface 30 of the disk portion 16 constitutes a cylindrical mating surface on which the outer rim portion 18 is fitted. The inner rim portion 14 and the disk portion 16 connect to each other with the intermediary of a shallow stepped portion, or shoulder, 32.

The outer rim portion 18 is produced by press-forming, or contracting, a steel sheet which is thinner than the wheel body 12. The outer rim portion 18, like the inner rim portion 14, is provided with a flange surface 34, a bead seat surface 36, and a well surface 38. The flange surface 34 and the bead seat surface 36, too, are covered by a layer of resin 40. The inside diameter of that part of the outer rim portion 18 where the well surface 38 is provided is slightly smaller than that of the outside diameter of that part of the disk portion 16 where the outer circumferential surface 30 is provided. Due to such a dimensional relationship, the outer rim portion 18 is lightly press-fitted on the surface 30 of the disk portion 16. An end face 42 of the outer rim portion 18 is abutted against the shoulder 32 which is defined between the inner rim portion 14 and the disk portion 16, whereby the disk portion 16 and the outer rim portion 18 are positioned relative to each other. When the outer rim portion 18 is fully fitted on the outer circumference 30 of the disk portion 16, the well surface 24 of the inner rim portion 14 and that 38 of the outer rim portion 18 become smoothly contiguous with each other.

The wheel body 12 and the outer rim portion 18 which are mated together as stated above are rigidly connected together by welding the shoulder 32 and the end face 42 of the outer rim portion 18 which is abutted against the shoulder 32, throughout the circumference of the assembly.

In the disk wheel 10 having the above structure, because the inner rim portion 14 and the disk portion 16 are formed integrally with each other by press-forming, the flange surface 20 and bead seat surface 22 of the inner rim portion 14 is positioned extremely accurately relative to the disk surface 28 of the disk portion 16. Hence, the center of the flange surface 20 and that of the beat seat surface 22 are surely positioned on the axis of rotation of the disk wheel 10.

The inner rim portion 14 has relatively great thickness and, therefore, accomplishes a sufficient degree of mechanical strength. The outer rim portion 18, on the other hand, is provided with relatively small thickness with no regard to the inner rim portion 14, cutting down the overall weight of the disk wheel 10.

The welded area of the wheel body 12 and outer rim portion 18 is located in the well which is defined by the outer periphery of the disk wheel 10, so that it is hermetically sealed by the tire T when the latter is mounted. This prevents water from entering the welded area to cause it to form rust even when the motor vehicle is in travel.

As previously stated, the flange surfaces 20 and 34 and the bead seat surfaces 22 and 36 are constituted by the resin layers 26 and 40, respectively. Hence, after the assemblage of the disk wheel 10, the flange surfaces 20 and 34 and the bead seat surfaces 22 and 36 are finished by cutting the resin layers 26 and 40 while rotating the wheel 10 about is axis of rotation. In this instance, because the layers 26 and 40 are respectively built up on the flange surfaces 20 and 34 and the bead seat surfaces 22 and 36, circularity is achievable simply by shaving the layers 26 and 40. In addition, because the layers of resin 26 and 40 are easy to shave, the surfaces 20, 22, 34 and 36 can be finished smooth.

When the tire T is put on the disk wheel 10 finished as described above, the beads B of the tire T make close contact with the flange surfaces 20 and 34 and the bead seat surfaces 22 and 36. In this condition, the tire T is accurately mounted with its center aligned with the axis of rotation of the wheel 10 while, at the same time, the tire T and wheel 10 are positively sealed from the outside. The sealability is further enhanced by the resin layers 26 and 40 which have greater flexibility than a steel sheet and with which the tire T is held in close contact. Consequently, leakage of air from the tire T is suppressed to maintain a necessary air pressure inside of the tire T.

The flexibility of the resin layers 26 and 40 offers another advantage that vibrations transmitted from the tire T are damped by the resin layers 26 and 40. This, coupled with the reduction of vibrations due to the improved circularity, allows a minimum of vibrations to occur in the disk wheel 10.

Further, the resin layers 26 and 40 serve to provide the flange surfaces 20 and 34 and the bead seat surfaces 22 and 36 with smoothness, facilitating manipulations for mounting and dismounting the tire T.

While the outer rim portion 18 has been shown and described as being provided with the flange surface 34 integrally therewith, the present invention is similarly applicable to a disk wheel of the type having a detachable side ring which serves as a flange.

What is claimed is:

1. A disk wheel for a motor vehicle, comprising:

an inner rim portion and an outer rim portion for supporting a tire; and a disk portion for mounting on a wheel hub of said motor vehicle;

said inner rim portion and said disk portion being integrally formed with each other with a shoulder means therebetween, said outer rim portion being formed independently of said inner rim portion and said disk portion, said integrally formed inner rim portion and disk portion being made by press-forming a first steel sheet and said independently formed outer rim portion being made by press-forming a second steel sheet which is thinner than said first steel sheet so that said inner rim portion and said disk portion are thicker than said outer rim portion;

wherein said outer rim portion is fitted on an outer circumferential surface of said disk portion such that an end face of said outer rim portion abuts said shoulder means and the outer circumferential surface of said inner rim portion and the outer circumferential surface of said outer rim portion smoothly connect to each other.

2. A disk wheel as claimed in claim 1, wherein said inner rim portion and said outer rim portion each include a flange surface and a bead seat surface for supporting a bead of a tire, said flange surface and said bead seat surface each having a layer of resin formed on said outer periphery of said inner rim portion and said outer rim portion wherein said resin layers of said flange surface and said bead seat surface absorb vibration imparted from a tire mounted thereon and form smooth flange and bead surfaces.

* * * * *